United States Patent [19]

Hope et al.

[11] Patent Number: 4,791,456
[45] Date of Patent: Dec. 13, 1988

[54] PHOTOGRAPHIC PRINTER APPARATUS

[76] Inventors: Henry F. Hope; Stephen F. Hope, both c/o Hope Industries, Inc., 5701 Moreland Rd., Willow Grove, Pa. 19090

[21] Appl. No.: 38,742

[22] Filed: Apr. 15, 1987

[51] Int. Cl.$^4$ ............................................. G03B 27/52
[52] U.S. Cl. ........................................ 355/28; 355/54; 355/71; 355/73
[58] Field of Search ............. 355/71, 28, 27, 64, 355/54, 65, 73, 76

[56] References Cited

U.S. PATENT DOCUMENTS

| | | | |
|---|---|---|---|
| 3,754,826 | 8/1973 | Kobayashi et al. | 355/73 X |
| 4,408,872 | 10/1983 | Vaughan | 355/28 |
| 4,618,255 | 10/1986 | Miyasaka et al. | 355/71 |
| 4,636,061 | 1/1987 | Staude et al. | 355/27 |

Primary Examiner—L. T. Hix
Assistant Examiner—D. Rutledge
Attorney, Agent, or Firm—Z. T. Wobensmith, III

[57] ABSTRACT

A photographic printer apparatus is provided, with quick change self-threading magazines of photographic material which enables use of different widths and types of photographic material at the input of the printer apparatus. A cutter station is positioned within the printer console adjacent the magazine input, where roll material is pre-cut to the desired size of the photographic print to be made before being exposed. Transport systems are provided in the console for vacuum guidance and positioning of the photographic material while it is being cut and for accurately positioning the photographic material opposite a first exposure station for exposure, and for transporting the piece of photographic material to a second exposure station or for storage and subsequent processing or to a continuously running processor adapted to develop, and wash and dry the previously exposed photographic material.

9 Claims, 5 Drawing Sheets

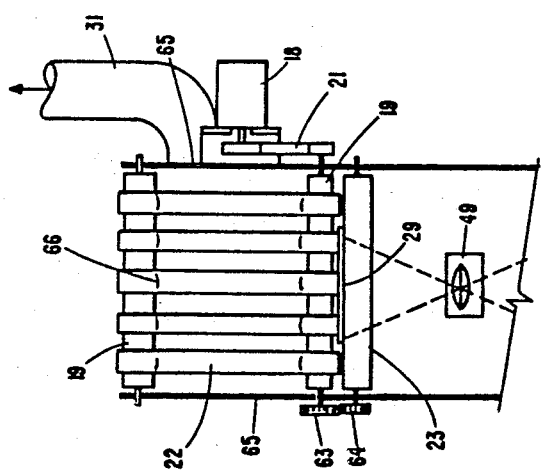
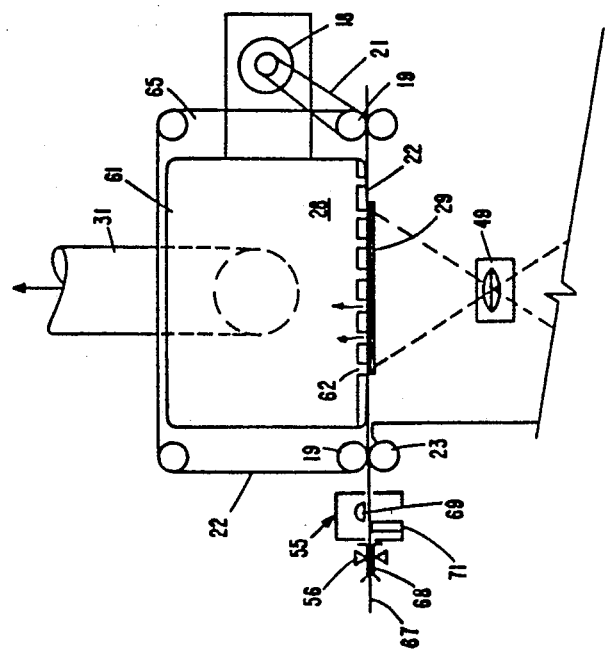

PHOTOGRAPHIC PRINTER APPARATUS

BACKGROUND OF THE INVENTION

1. Field of the Invention

This invention relates to apparatus for making photographic prints from negatives, positive slides, prints or other materials, and is of the type which includes at least one magazine for storing light sensitive photographic material on a roll, which material is dispensed in the desired size, and transported for exposure by a transport system which provides for vacuum support and guidance of the material, and which material may be subsequently processed after exposure.

2. Description of the Prior Art

Computer controlled photographic printers are commercially available from several worldwide manufacturers. Such photographic printers are adapted to transport and expose photosensitive paper either by contact printing or by image projection systems. The exposed or printed photographic paper is chemically processed, then washed and dried to produce finished photographic prints.

Large photofinishing labs usually have dedicated printers for exposing one type and/or one size of photographic paper. The photographic paper is on rolls in light tight magazines, and after being exposed is collected in light tight magazines. The exposed paper is then unwound from the roll magazines and fed into a photographic processor. While large photofinishing laboratories may have a large volume of different sizes and types of film to be processed and developed, and can well afford to have several dedicated printers and dedicated processors, the cost for the required number of processors is high and requires a large volume of material to support.

Even medium size photofinishing laboratories are limited to the types and sizes of prints that they are able to process, and usually do not attempt to offer a complete range of types and sizes of finished product.

In recent years printers have been connected directly to film processors so that once film has been developed, prints can be made and processed by a single operator at a console or control station of a printer. The most popular type printer processors are commonly referred to as Mini-Labs, and provide photographic prints from roll or disk film within one or two hours after receipt of the exposed film. Such printer processors are available from many manufacturers, such as Hope Industries, Inc. of Willow Grove, Pa., as well as numerous other manufacturers. These printer-processors are capable of making prints from negative film, but do not usually also process reversal prints from positives, nor do they process black and white prints from negatives, nor do they process prints from prints.

It is extremely desirable to provide a photographic printer apparatus that may be operated by a single operator and that is both cheaper and more reliable than previously available apparatus and which also can expose, and if desired, process a wide variety of light sensitive photographic material of various sizes and types.

SUMMARY OF THE INVENTION

Photographic printer apparatus for rapidly providing finished photographic products from projections or negatives, positives or other prints. A magazine dispenses a desired product type of light sensitive photographic material, which is cut to a predetermined size and delivered to a transport mechanism, which transports and by vacuum accurately guides and positions the photographic material to a projection station for exposure, and then transports the exposed photographic material to another station or to storage or to a continuously running processor for development.

The principle object of the invention is to provide printer apparatus for rapidly making photographic prints from light sensitive photographic material, stored on rolls in light tight magazines and dispensed in controlled sizes, from which prints can be made from negatives, positives, or other prints at one or more exposure stations.

It is a further object of the invention to provide apparatus of the character aforesaid which can make reduced or enlarged photographic prints, of the same or different sizes without changing the magazines in which the rolls are stored.

It is a further object of the invention to provide apparatus of the character aforesaid which includes a reversible roll magazine and a cutter for supplying photographic material of the desired length to a printing or enlarging station.

It is a further object of the invention to provide apparatus of the character aforesaid which includes a plurality of rapid loading roll magazines which may contain different sizes and/or different types of photographic material, which can be rapidly changed to provide the desired type and size of photographic material.

It is a further object of the invention to provide apparatus of the character aforesaid which can be loaded and unloaded in daylight.

It is a further object of the invention to provide apparatus of the character aforesaid which apparatus has the ability to make single or multiple prints of the same size, or a different size without the necessity of processing an incomplete order and accumulating orders of the same size and type.

It is a further object of the invention to provide apparatus of the character aforesaid which can be operated with or without a mask or a safety space between prints, and can thereby eliminate location markers between the prints, which would require post exposure cutting and waste of photographic material.

It is a further object of the invention to provide apparatus of the character aforesaid which includes a transport system with vacuum support and guidance of the photographic material so that the photographic material may be self-threading and accurately located opposite the projection exposure stations.

It is a further object of the invention to provide apparatus of the character aforesaid which may have plural exposure stations under the control of a single operator and a single computer or other control system.

It is a further object of the invention to provide apparatus of the character aforesaid which may be connected to a plurality of continuously running processors each capable of processing different types of light sensitive photographic material.

It is a further object of the invention to provide apparatus of the character aforesaid which is capable of providing a variety of photographic processing services which employs fewer components than previously available apparatus thereby providing increased reliability and reduced cost.

Other objects and advantageous features of the invention will be apparent from the description and claims.

BRIEF DESCRIPTION OF THE DRAWINGS

The nature and characteristic features of the invention will be more readily understood from the following description taken in conjunction with the accompanying drawings forming part hereof in which:

FIG. 2 is an enlarged side elevational view of a preferred embodiment of the transport system portion of the apparatus shown in FIG. 1;

FIG. 3 is an enlarged end elevational view of the transport system shown in FIG. 2;

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
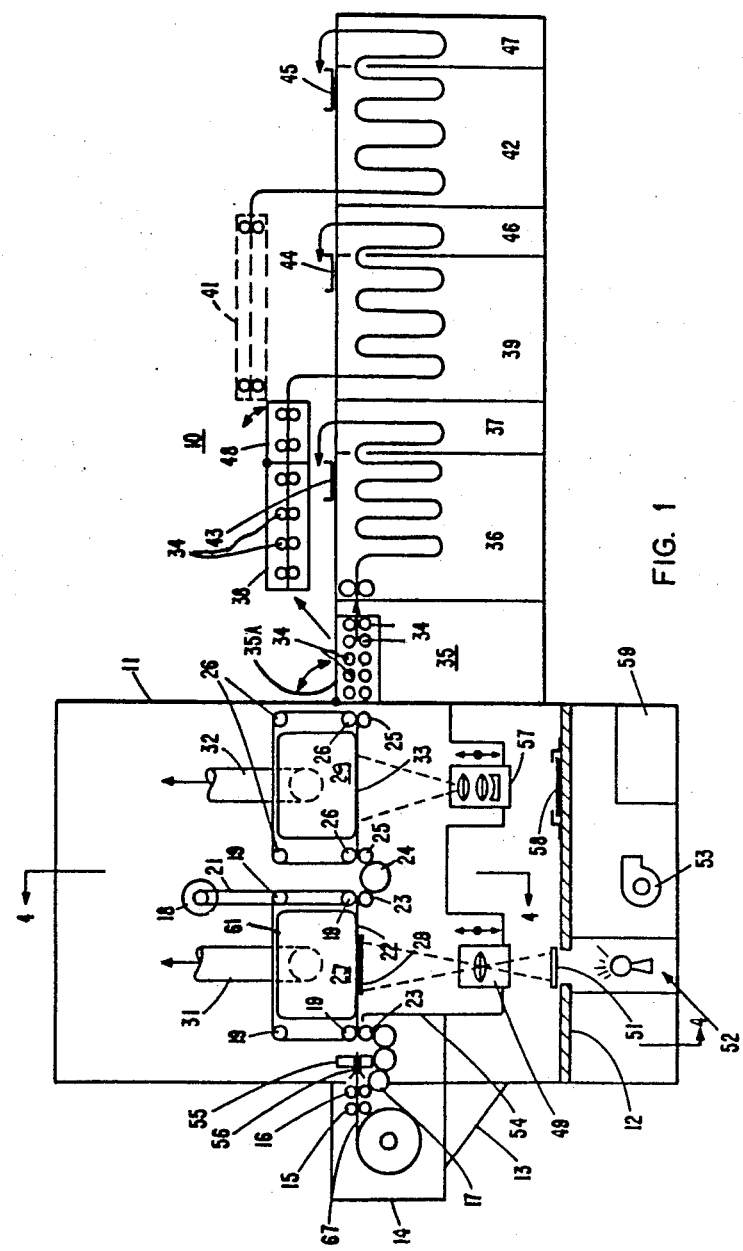
FIG. 1 is a schematic side elevational and partial sectional view of a preferred embodiment of the photographic printer apparatus which is shown connected to three different photographic material processors.

Referring now to the drawings and FIGS. 1 and 2 thereof, the preferred embodiment of the photographic printer apparatus 10 is illustrated, which includes a light tight printer console cabinet 11, with an operator's working table 12, and a shelf 13 attached to the console 11, for supporting a magazine 14 containing a roll 67 of light sensitive photographic material, which may be paper, film, or other material as required. The photographic material 67 from magazine 14 is fed into a pair of feed rollers 15, which may be driven either forward or in reverse, for feeding material 67 to the console 11 or for retracting material from the console 11. Rollers 16 are provided after feed rollers 15 to provide a light seal, and may be driven by a single gear 17, which engages a gear (not shown) on the ends of the rollers 16 and may also be employed to drive the feed rollers 15 through an idler gear (not shown). If desired, rollers 16 may also be used as metering rollers.

A motor 18 is provided which may be a high precision stepping motor of approximately 400 steps per revolution, and which can be geared down to provide 1″ movement of the transport belts on the vacuum box [to be described] to provide an accuracy of 1/400th of an inch per step. The stepper motor 18 is preferably coupled to rollers 19 through a timing belt 21 to provide accurate movement of the rollers 19. Belts 22 are mounted on pulleys [to be described], of rollers 19 which are engaged by soft nip rollers 23. A first exposure station 27 is provided adjacent belts 22 and is the exposure station for a piece of light sensitive photographic material 28 which has been accurately positioned by the stepper motor 18, and held in place against the belts 22 by vacuum supplied through a flexible hose 31. Gears (not shown) on the nip rollers 23 engage an idler gear 24, and drive gears (not shown) on nip rollers 25 which drive rollers 26 of a second exposure station 29.

As is more clearly shown in FIG. 2, the photographic material 67 from magazine 14 is fed into converging guides 68 at a photocell sensing station 56, before exiting at a cutter station 55, which station 55 includes a movable blade 69, and a stationary blade 71. When cutting a piece of material 67, the belts 22 are stopped during the operation of cutters 55 and 71, and the left most roller 19 and 23 are so positioned as to hold the severed piece of material 28 in position after it is cut to size. After the material is cut, it is then transported to exposure station 27 as shown in FIGS. 1 and 2 for exposure.

The exposed piece of photographic material 28 may be transported to the second station or vacuum box 29 by belts 22 to and through rollers 25 and 26, where it is held against the belts 33 by vacuum from flexible hose 32. The piece 28 may be exposed at station 29 if desired. The piece 28 is retained on the belts 33 as it is subsequently transferred to a distribution station 35.

The distribution station 35 includes a plurality of rollers 34 which receive the exposed piece 28 from nip rollers 25 and 26. When an exposed piece 29 enters a rack 35A of station 35 and between the rollers 34, it may be conveyed through a first processor 36, which is preferably a positive color processor of well known type, and includes a drying station 37. If the exposed piece 28 is conveyed to the first color processor 36, it passes through drying station 37 and exits into a receiving bin 43. If the rack 35A is articulated to its upper position, the exposed piece 28 will enter a conveyor 38, which can include rollers 34, and it is thereby conveyed to a second processor 39 of well known type, which may be a reversal color processor, and will pass through drying station 46 and exit into the receiving bin 44. If the exposed piece 28 is conveyed to a third processor 42 of well known type, which is preferably a black and white processor, the exposed piece 28 will pass through drying station 47 and exit into a receiving bin 45. Each of the processors 36, 39, and 42 are provided respectively with dryers 37, 46, and 47 of well known type. It should be understood that the prints deposited in the receiving bins 43, 44, or 45 may be deposited in an order sorter (not shown) which comprises a plurality of bins (not shown) used for assimilating customer's orders. Such order sorters and bins are well known in the prior art and are not further described.

Referring again to FIG. 1, a projection lens system 49 is illustrated opposite to exposure station 27 and which preferably includes a zoom type lens mounted in a turret or a transverse articulating shelf box (not shown), so that lenses of different focal lengths and sizes may be presented opposite a negative 51, the image of which is projected onto the pre-cut photographic material piece 28, by a light and filter system 52 of well known type.

An exhaust fan or vacuum blower 53 is provided in the base of the console 11, and is preferably of the low speed squirrel cage quiet type, which provides two to three inches of negative water pressure and is connected to flexible hoses 31 and 32 to provide a vacuum. The positive or output side of the blower 53 may be connected to the light system 52 for cooling, which eliminates the need for extra cooling blowers. The inlet to the light console 11 is preferably provided with a standard dust filter (not shown), to reduce the incidence of contamination. A light and dust shield 54 is provided which forms a light seal, and prevents dust from the cutter blades 55 and 71 from entering the system as the piece 28 of photographic material is transported and exposed. The photocell sensing station 56 is located in front of the cutter station 55, to sense the presence or absence of photographic material being automatically fed by the feed rollers 15, or being retracted prior to changing magazines 14.

In the embodiment shown in FIG. 1, the second exposure station 29 is illustrated opposite a reversal lens system 57 of well known type, which enables the operator at the console to copy a positive print 58, or a three dimensional object directly onto a piece of light sensitive photographic material 67 such as positive photographic paper, which is held by the belts 33 in a position similar to piece 28 at exposure station 27. It should be understood that when the second exposure station 29 is in operation, the operator can continue to transport the piece 28 of photographic material from the first transport station 27 to the second transport station 29 for the second exposure of the piece 28. The operator is provided with a keyboard (not shown) to select, by means of controls 59, which of the stations 27 or 29 operates or which of the processors 36, 39 or 42 operates or if the photographic material is not to be processed. The controls 59 may be connected to operate in a manner similar to other prior art printer processors manufactured by Hope Industries, such as shown in U.S. Pat. No. 4,526,462. The same controls as described in U.S. Pat. No. 4,526,462 may be employed to control the feed rollers 15, and the stepping motor 18 which meters the distance moved by the belts 22 and 33. Such controls may operate in two modes. The first mode is to determine the proper exposure and color correction to be employed by the light system 52, and the second mode controls the advancing and positioning of the photographic material 67, and the operation of the cutter station 55 which is in response to the photocell sensing means 56, as well as actuating mechanism (not shown) for replenishing the processors 36, 39, and 42.

Referring now more particularly to FIGS. 2 and 3, the first exposure station 27 includes a vacuum box 61 having holes or apertures 62 in the bottom, the side and between the belts 22. As shown in FIGS. 2 and 3, the stepper motor 18 is preferably mounted on the side of the vacuum box 61, and connected by the timing belt 21 to the roller 19. A gear 63 is provided at the opposite end of the driven roller 19, which is engaged by a second gear 64 which drives the soft nip roller 23. A plate 65 is provided in which the rollers 19 and 29 are mounted and which is connected to the vacuum box 61. The rollers 19 have a plurality of crown type pulleys 66 thereon, which causes the belts 22 to track and to be centered on the pulleys 66. For purposes of the invention, and as described below, the term film frame will be defined to mean a negative, a positive slide, a print or anything to be projected as an image.

Figure 4:
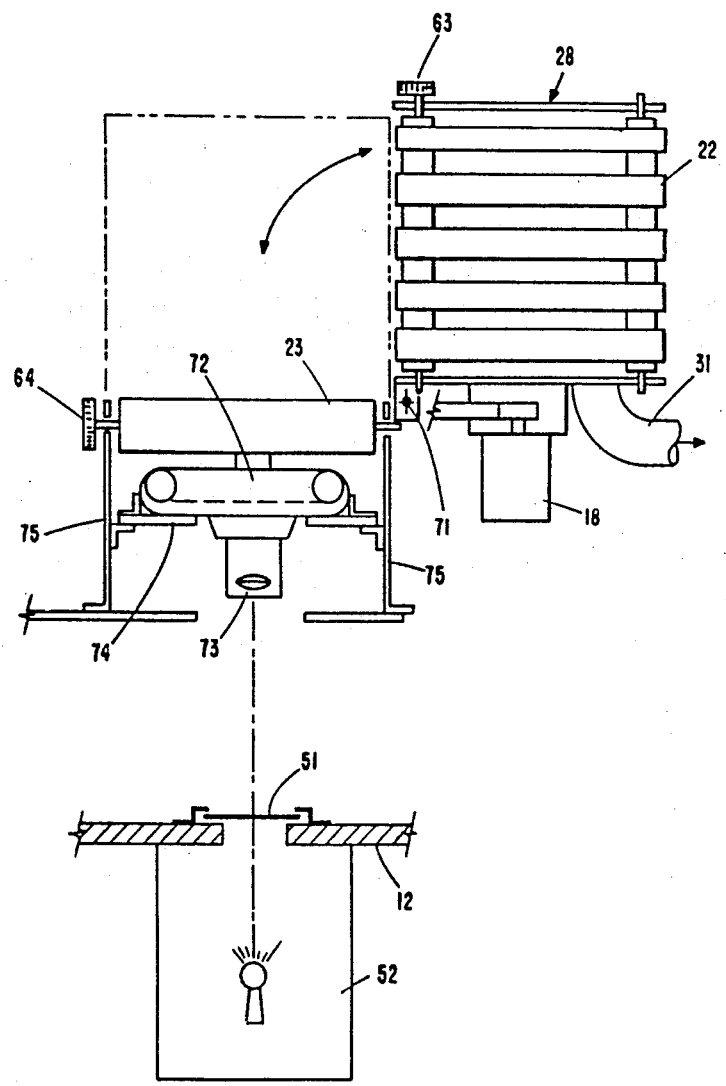
FIG. 4 is a horizontal sectional view taken approximately on the line 4—4 of FIG. 1 showing a modification of the transport system shown in FIGS. 2 and 3, and with a slide film camera as used for duplicating slide transparencies.

Referring now more particularly to FIG. 4, a modified transport system is illustrated, which may be incorporated into the first station 27. The first exposure station 27 may be pivoted on a hinge 71, so as to swing away from the rear of the console 11, permitting access to the housing 54 and positive slide 51. A camera 72, preferably of the fixed focus type, having its own lens system 73 and automatic advance motor (not shown), is attached to an adaptor plate 74, and can be placed in the position shown. Side plates 75 constitute a part of the inner housing console 11 and are adapted to support a nip roller 23 which has a gear 64 thereon, which is not driven when the camera 72 is employed. When camera 72 is employed to make slide to slide duplications, the normal and preferred exposure printing piece 28 is not employed. After making whatever slides are desired, the camera 72 and adapter plate 74 are removed and the exposure station 27 is returned to its operating position. When continuous orders or large orders of slide to slide duplication are being processed, a large container or body such as a Beady back system may be employed, with a lens system (not shown) interposed between the positive slide or film frame 51 position and the back system (not shown).

Figure 7:
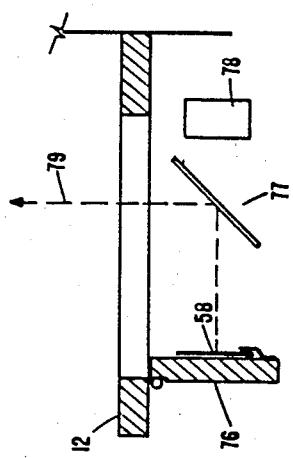
FIG. 7 is a side elevational view of the transport system of FIG. 5.
Figure 5:
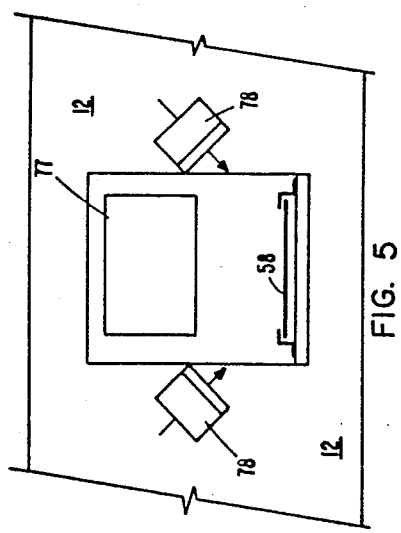
FIG. 5 is a top plan view, enlarged, of a modification of the second transport system of FIG. 1.
Figure 6:
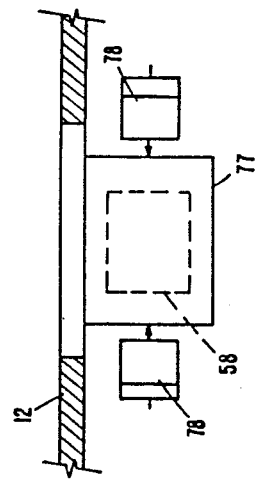
FIG. 6 is a front elevational view of the transport system of FIG. 5.

Referring now more particularly to FIGS. 5 to 7, which shows the top, front and side views of a modified embodiment of the work station portion of the second exposure station 28, and where instead of placing print 58 on the table 12 in the horizontal or flat position as shown, the table 12 may be modified by providing a hinge plate 76 pivoted on table 12, so that it may be positioned below the surface of the table. A flat mirror 77 is shown, mounted at a 45° angle to reflect an image of the print 58 along the vertical axis 79. Strobe lights 78 are placed on either side of the mirror 77 so as to provide balanced illumination on the print 58. When the mirror and light system is employed, the flash of the strobe lights 78 is not obtrusive, and the reversing lens system 57 shown in FIG. 1 is not required for a one to one print to print exposure. Not only does the modified system of FIGS. 5 to 7 properly orient the picture at the exposure station 29, but it eliminates the need for a light system which could interfere with the operator at the console 11.

Figure 8:
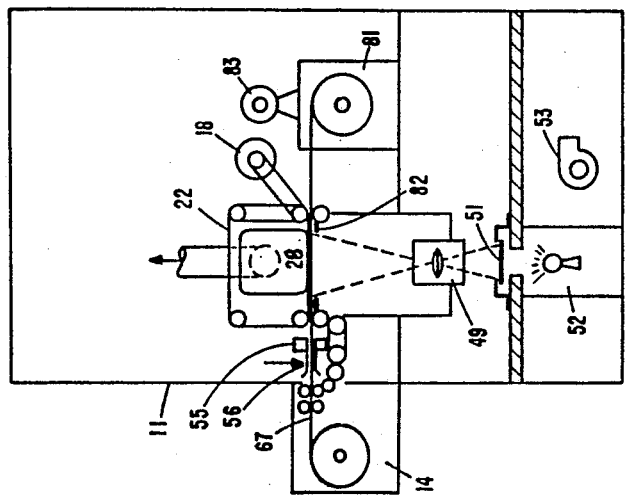
FIG. 8 is a side elevational view of a modification of the apparatus as shown in FIG. 1 and illustrates a self-threading roll to roll magazine embodiment of the invention.

Referring now more particularly to FIG. 8 which shows a modification of the apparatus shown in FIG. 1, a self-threading magazine 14 is shown mounted on the console 11, so as to feed photographic material such as paper 67 through the photocell sensing station 56 and the cutter station 55. The magazine 14, in this embodiment, is used for self-threading to feed the continuous paper roll 67 to the exposure station where it is exposed before being transported to the takeup magazine 81. This embodiment may be characterized as a self-threading free-standing magazine roll to magazine roll use of the invention. The cutter station 55 is used in this embodiment to sever the photographic material and to retract the photographic material into the magazine 14 before changing magazines. The exposure station and lens system is preferably the same as that described previously for FIG. 1. It should be understood that the takeup magazine 81 may be a daylight loading self-threading magazine 81 of a prior art type, and which can be removed from the console 11 and processed at a dedicated processor. It should also be noted that this modification requires the use of a mask 82, and friction clutch drive mechanism 83, to use the exposure station 27 and the self-threading magazine 14 as previously described.

Figure 9:
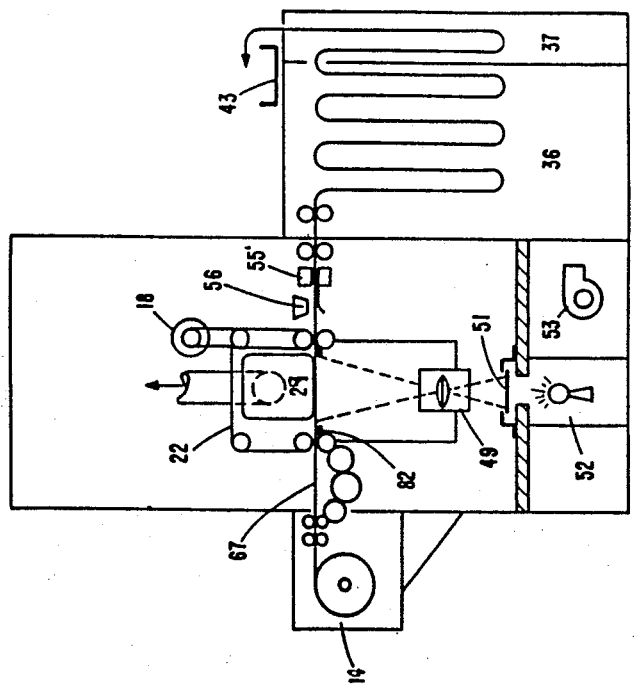
FIG. 9 is a side elevational view of another modification of the apparatus shown in FIG. 1 and illustrates a self-threading roll magazine to cutter and to processor embodiment of the invention.

Referring now more particularly to FIG. 9, which shows a further modification of the apparatus of FIG. 1, which may be characterized as a self-threading and free-standing magazine roll to cutter and to processor embodiment, magazine 14 supplies roll material to the exposure station 29 which can use the mask system 82 as previously described. After the material 67 is exposed, it is transported to a cutter station 55', which is similar to cutter station 55 previously described. By employing the stepper motor 18 and photocell sensor 56 for sensing the edge of the material to be exposed, it can be severed without waste. The stepper motor 18 can advance a frame at a time and if the cutter station 55' is properly located relative to the exposure station 29, the prints may be severed by the cutter station 55' in a manner which eliminates the safety space between prints. The pre-cut prints are then transported to a processor 36 of well known type which has a drying station 37 and a receiving bin 43 as previously described.

It should be apparent that a single vacuum transport station can be employed to make universal prints by using two exposure positions. However, the simplicity of the vacuum transport mechanism and its reliability encourages the use of a separate and distinct second exposure station for making prints from prints. Thus the most economical version of the invention would employ a single exposure station as shown in FIGS. 1, 8, or 9 and a single processor, and with the cutter 55 in front of the transport station and vacuum to hold the pre-cut material 28 at the exposure station 27, and subsequently to transport the exposed material 28 to the next station or to the processor.

Employing two vacuum transport stations, or one vacuum transport station with two exposure positions, in combination with two color processors and one black and white processor will enable one operator to provide virtually Universal photofinishing services in one machine.

The light tight photographic magazines 14 or 81 are provided with feed rollers which can feed or retract the photographic material so that there is no waste of material when changing from one size material to another, or from one type of material to another. Thus, the invention can provide not only Universal photofinishing services, but also permits the operator to enlarge or reduce the print size.

It should be noted that while the invention has been illustrated with computer control of the apparatus, mechanical or electromechanical can be employed, if desired.

It will thus be seen that apparatus has been provided with which the objects of the invention are achieved.

We claim:

1. Photographic printer apparatus for making prints from negatives, positives, prints or other material which comprises
    dispensing means for dispensing a measured size and type of light sensitive photographic material,
    at least one exposure station means for exposure of said photographic material,
    transport means for transporting said photographic material to said station for exposure,
    said transport means includes continuous vacuum support means at the exposure station and guidance means for said material.
2. Apparatus as defined in claim 1 in which
    said dispensing means includes at least one magazine containing a roll of light sensitive photographic material, and
    a cutter station adjacent to said magazine for cutting said material to the desired length.
3. Apparatus as defined in claim 1 in which
    said exposure station means includes a projection station for projecting an image from said negatives, positives or other material, and
    an exposure station opposite to said projection station for positioning said photographic material for exposure to said image.
4. Apparatus as defined in claim 3 in which
    said exposure station includes a box to which vacuum is applied,
    apertures in said box facing said projection station, and
    belt means for transporting said photographic material over said apertures whereby said vacuum from said box holds said photographic material thereon.
5. Apparatus as defined in claim 4 in which
    said belt means is driven by a stepper motor.
6. Apparatus as defined in claim 1 in which
    distribution means is engaged with said transport means and at least one processor is in communication with said distribution means.
7. Apparatus as defined in claim 6 in which
    said distribution means includes a hinged rack having a plurality of rollers which receives said photographic material and directs it to said processor.
8. Apparatus as defined in claim 1 in which
    said dispensing means includes a photocell sensing means sensing said photographic material prior to engagement with said cutter station to indicate the presence or absence of photographic material and control the operation of said cutter station.
9. Apparatus as defined in claim 1 in which
    said dispensed photographic material is always held by at least one edge.

* * * * *